Dec. 31, 1968     J. F. GRUNBERG ET AL     3,418,819
LIQUEFACTION OF NATURAL GAS BY CASCADE REFRIGERATION
Filed June 16, 1966
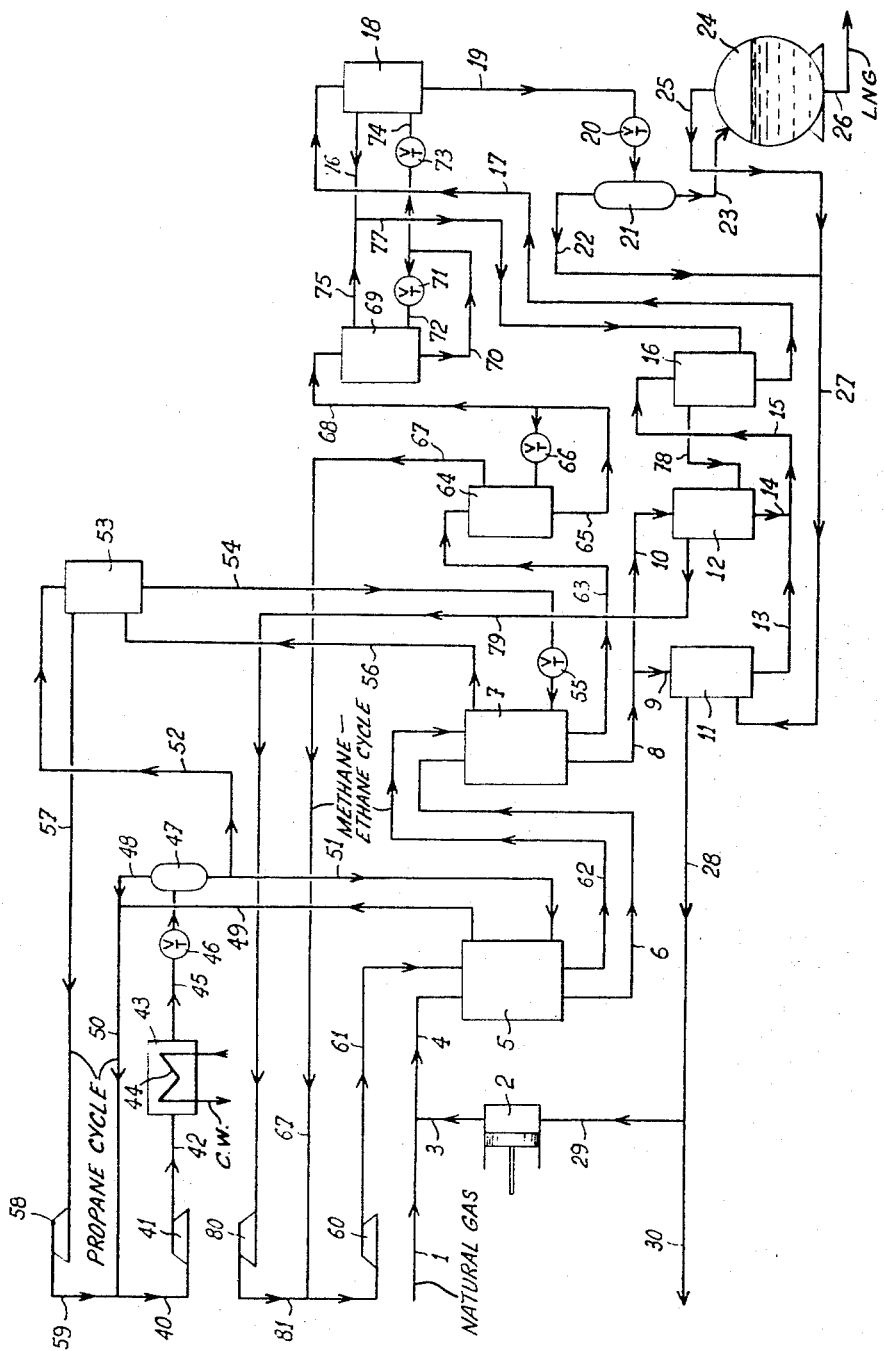
INVENTORS
JACQUES FRED GRUNBERG
HARUMITSU TAKAGI

United States Patent Office

3,418,819
Patented Dec. 31, 1968

3,418,819
LIQUEFACTION OF NATURAL GAS BY CASCADE REFRIGERATION
Jacques Fred Grunberg, Outremont, Canada, and Harumitsu Takagi, Ashiya, Japan, assignors to L'Air Liquide Societe Anonyme Pour l'Etude et l'Exploitation des Procedes Georges Claude and Teikoku Sanso Kabushiki Kaisha
Filed June 16, 1966, Ser. No. 557,983
Claims priority, application France, June 25, 1965, 22,421
2 Claims. (Cl. 62—11)

ABSTRACT OF THE DISCLOSURE

Natural gas is liquefied by employing cascade refrigerant natural gas, is cooled, and a first refrigerant mixture of methane and ethane is liquefied in a first cooling zone by countercurrently flowing a vaporizing propane refrigerant. The refrigerant mixture is further cooled and split into two portions, each one of which is expanded and then vaporized in heat exchange with natural gas being liquefied and the refrigerant mixture being further cooled. The vaporized refrigerant portions are recombined and used to cool subsequent portions of natural gas feed. Liquefied natural gas is expanded to separate a methane rich fraction.

---

This invention relates to a process for liquefying a volatile gas consisting essentially of methane, natural gas in particular, in which the gas is ultimately liquefied by heat exchange with a fluid refrigerant in the course of vaporization consisting essentially of methane and at least one hydrocarbon with two carbon atoms from the group comprising ethane and ethylene.

In one known process for cooling and, in particular, liquefying a gaseous mixture, the gaseous mixture is subjected to fractionate condensation and at least one of the condensed fractions is expanded, vaporised by heating exchange with the mixture in the course of condensation, recompressed and then recombined with the gaseous mixture to be cooled. An important improvement in this process known as the "incorporated cascade cycle" or the "autorefrigerated cascade cycle" in which at least the greater part of the fraction intended to be recompressed and recombined with the gaseous mixture to be cooled, is recycled at a pressure higher than that at which a more volatile constituent to be collected as a liquid is produced and, in particular, stored, was the subject of U.S. Patents Nos. 3,218,816 and 3,274,787.

Although the "incorporated cascade cycle" process has significant advantages by virtue of the fact that only one compressor is required for the refrigeration cycle as a whole, the amount of energy required for refrigeration is somewhat greater than that used in a conventional cascade cycle with separate successive circuits of different fluid refrigerants, whilst the volume of gas to be recycled is large in comparison with the volume of gas to be cooled, which involves the use of heat exchangers of large surfaces.

In addition, there was already made an improvement to the conventional cascade-type refrigeration cycle with separate successive circuits of different fluid refrigerants, by subjecting the most volatile fluid refrigerant to expansion with external work which enables its refrigerating capacity to be increased very appreciably without any increase in its volume. This improvement was the subject of U.S. Patent No. 3,066,492. Unfortunately, it does not contribute towards reducing the complexity of the apparatus embodying the conventional cascade refrigeration cycle, or the difficulties involved in its control. In particular, it always incorporates a compressor for each fluid refrigerant used.

The object of the process according to this invention is to obviate the respective disadvantages of the "incorporated cascade" cycle and of the conventional cascade cycle and, in particular, to enable a volatile gas consisting essentially of methane, natural gas in particular, to be cooled and, if necessary, liquefied, with an amount of energy not exceeding that used in a conventional cascade cycle, in a relatively simple apparatus which comprises few compressors and which is relatively easy to control. The process according to the invention is distinguished by the fact that the fluid refrigerant consisting essentially of methane and at least one hydrocarbon with two carbon atoms from the group comprising ethane and ethylene, has a sufficient content of $C_2$-hydrocarbons to be liquefied almost completely by heat exchange with another fluid refrigerant in the course of vaporisation under atmospheric pressure and at a temperature in the range from 0° C. to −55° C.

In addition, the process according to the invention preferably comprises the following features, either separately or in combination:

(a) The other fluid refrigerant is a $C_3$-hydrocarbon from the group consisting of propane and propylene.

(b) The other fluid refrigerant is itself a mixture of two different constituents which can be liquefied almost completely by heat exchange with cold water.

(c) When the volatile gas to be liquefied is a gas which contains a substantial proportion of constituents more volatile than methane, and when it is expanded to a low pressure before use, at least most of the volatile vapours released during its expansion are recompressed and recombined with the gas to be liquefied.

(d) When the volatile gas to be liquefied is one which contains a substantial proportion of constituents more volatile than methane and when it is stored before use, at least most of the volatile vapours released during its storage are recompressed and recombined with the gas to be liquefied.

(e) When the volatile gas is expanded after its final liquefaction to a low pressure, for example, for storage, the first fluid refrigerant additionally contains nitrogen in a proportion sufficient to enable the natural gas to be subcooled to a temperature low enough to prevent it from being vaporised during expansion.

Among the other fluid refrigerants which may be used either separately or in admixture to liquefy, by their vaporisation, the fluid refrigerant based on methane and ethane or ethylene, propylene, isobutane, ammonia, and monochlorodifluoromethane are particularly suitable.

A liquefaction plant for natural gas embodying the process according to the invention is described in the following by way of non-limiting example with reference to the accompanying drawing. This plant comprises a propane-based refrigeration circuit by which the natural gas is cooled to −35° C., followed by a circuit using a mixture of ethane and methane by which the natural gas is liquefied.

The natural gas to be liquefied is available at a pressure of around 42 bars absolute and at ambient temperature. Following the optional step of purification (in an apparatus which is not shown) intended to eliminate any corrosive constituents (e.g. hydrogen sulphide) and higher boiling hydrocarbons, its composition is as follows (by volume): hydrogen 0.17%, nitrogen 1.2%, methane 93%, ethane 4.15%, propane 1.1%, butanes 0.33%.

The natural gas flowing in through the pipe 1 at a rate of 1042 m.³/h. (corrected for normal conditions), is joined through the pipe 3 by a combustible gas rich both in methane and in nitrogen, whose supply source will be discussed further on, at a rate of 223 m.³/h., after it has been recompressed in the compressor 2 from a pressure slightly higher than atmospheric pressure. The mixture is then delivered through the pipe 4 to the heat exchanger 5 where it is cooled to around +3° C. by liquid propane in the course of vaporisation at a pressure of 4.3 bars. It then flows through the pipe 6 to the heat exchanger 7 where it is cooled to around −35° C. by heat exchange with liquid propane boiling at around atmospheric pressure. It then flows through the pipes 8 and either of the parallel pipes 9 and 10 to the heat exchangers 11 and 12 where it is cooled to around −80° C. In the heat exchanger 11, a first part of it flows in countercurrent to a combustible gas consisting essentially of methane and nitrogen separated from the liquefied natural gas during its expansion and storage. In the heat exchanger 12, a second part of it flows in countercurrent to a gaseous mixture of ethane and methane at a pressure around atmospheric. The two portions of cooled and partly liquefied natural gas are combined through the pipes 13 and 14 and delivered through the pipe 15 to the heat exchanger 16 in which the natural gas is cooled to −90° C. by heat exchange with the gaseous mixture of ethane and methane at low pressure.

The natural gas is then delivered through the pipe 17 to the heat exchanger 18 where it is cooled to around −140° C. and liquefied in countercurrent to the liquid mixture of ethane and methane flowing through the pipe 74 after expansion to a low pressure in valve 73.

The liquefied natural gas then flows through pipe 19 towards the expansion valve 20 where its pressure is reduced to 1.1 bars absolute, after which it enters the separator 21. A combustible gas containing 84% of methane, 14.5% of nitrogen and 1.5% of hydrogen is removed from the upper end of the separator 21 through the pipe 22, at a rate of around 220 m.$^3$/h. The liquefied natural gas is removed from the bottom of the separator 21 at a rate corresponding to some 1040 m.$^3$/h. and is then introduced through a pipe 23 into storage vessel 24. The vapours formed as a result of heat leaks are removed from the top of the storage vessel through pipe 25 and recombined through this pipe with the gas emanating from the separator 21. The liquefied natural gas produced at a rate of 1000 m.$^3$/h., whose composition is very similar to that of the treated gas, can then be delivered through the pipe 26 to a point of use.

Having been combined in the pipe 27, the combustible gases rich both in methane and nitrogen which are removed through the pipes 22 and 25, are reheated to −40° C. in the exchanger 11. They then flow through the pipe 28 and in part through the pipe 29 to the compressor 2 where they are recompressed to the pressure of the natural gas, at a rate of 223 m.$^3$/h., and in part to a point of use, for example in boilers, at a rate of 42 m.$^3$/h.

The propane refrigeration cycle is operated at two different pressure levels. It will be noted, however, that it could also be operated at a larger number of pressure levels so as to produce a more stagewise cold supply and hence a better refrigeration recovery.

The propane at a pressure around atmospheric pressure is recompressed in compressor 58, preferably a turbocompressor, to 4.3 bars. It is then recombined with the propane vaporised at this intermediate pressure which flows through pipe 50, and then introduced through pipe 40 into turbo-compressor 41 which brings it to a pressure of 9.5 bars. The compressed propane is introduced at a rate of approximately 1290 m.$^3$/h. (corrected for normal conditions) through pipe 42 into the water cooler 43 (the circulation of water introduced at +18° C. being shown at 44). Having thus been liquefied at around +25° C., it flows through pipe 45 towards expansion valve 46 where its pressure is lowered to 4.3 bars, and then to the separator 47, in which vapours are released at a rate of approximately 266 m.$^3$/h., and are delivered through the pipes 48 and 50 to the intake end of the compressor 41.

The residual liquid propane whose volume corresponds to 1020 m.$^3$/h. of gas under normal conditions, is divided into two parts. The first, of approximately 200 m.$^3$/h. volume, is delivered through pipe 51 to the heat exchanger 5 for pre-cooling the natural gas, in which it is re-heated to around −3° C. It is then combined through the pipe 49 with the vapours circulating in the pipes 48 and 50, and recycled with them at 4.3 bars to the intake end of the compressor 41. The second part of the liquid propane flows at a rate of approximately 825 m.$^3$/h. through the pipe 52 to the heat exchanger 53 where it is subcooled by heat exchange with the propane vapours at low pressure. It is then delivered through pipe 54 to expansion valve 55 where its pressure is reduced to a pressure around atmospheric. It is vaporised in the heat exchanger 7 in countercurrent to the natural gas to be cooled and the fluid refrigerant based on methane and ethane. It is then returned through pipe 56 to the heat exchanger 53 where it is re-heated to around −8° C. before being delivered through the pipe 57 to the compressor 58 of the first recompression stage.

The refrigeration cycle based on the methane/ethane mixture also comprises two pressure stages. The fluid refrigerant consists of approximately 45% by volume of methane and 55% of ethane. Its ethane content is therefore sufficient to enable it to be totally liquefied at a pressure of 47.5 bars absolute by heat exchange with liquid propane boiling around atmospheric pressure, while its vaporisation at atmospheric pressure ensures the total liquefaction of the natural gas at 42 bars.

The mixture of methane and ethane flowing through pipe 79 at a pressure somewhat in excess of atmospheric, is brought by compressor 80 to a pressure of 6.8 bars and then recombined through pipe 81 with the mixture at mean pressure flowing through pipe 67. The whole is then delivered by compressor 60 to pipe 61 at a rate of 1500 m.$^3$/h. (normal conditions). It is cooled to +3° C. in the heat exchanger 5 simultaneously with the natural gas by liquid propane at intermediate pressure. It then flows through the pipe 62 into the heat exchanger 7 where it is cooled with the natural gas to around −35° C. and then liquefied in counter current to liquid propane in the course of vaporisation at low pressure.

The liquid mixture of methane and ethane is then delivered through pipe 63 to the heat exchanger 64 where it is subcooled to around −82° C. by indirect exchange with an expanded liquid fraction of this same mixture. At the outlet end of this exchanger adjoined by the pipe 65, a fraction of approximately 460 m.$^3$/h. is expanded in valve 66 to around 6.8 bars, vaporised and reheated to approximately −42° C. in this exchanger in counter current to the liquid mixture under pressure, and then delivered through pipe 67 to the intake end of the compressor 60.

The remaining fraction of the subcooled liquid mixture of methane and ethane flow through pipe 68 into the exchanger 69 where it is further subcooled to around −140° C. in countercurrent with an expanded liquid fraction at low pressure.

Of the subcooled liquid mixture leaving this heat exchange through pipe 70, a first fraction (505 m.$^3$/h.) is expanded in valve 71 to approximately 1.5 bars and delivered through pipe 72 in countercurrent with the liquid under pressure into the exchanger 69. The second fraction (535 m.$^3$/h.) is expanded in the valve 73, also to 1.6 bars, and introduced through the pipe 74 into the exchanger 18 in countercurrent to the natural gas to be liquefied. After most of the methane which they contain has been vaporised, the two fractions reheated to around −100° C. are removed through pipes 75 and 76, respectively, and then delivered through pipe 77 into the heat exchanger 16 where they are further vaporised, whilst their temperature rises to around −92° C.

The partially vaporised refrigerating mixture then flows through pipe 78 into the exchanger 12 where the ethane present in it is vaporised, and where it is reheated to −40° C. in countercurrent to the natural gas to be cooled. The mixture thus partially reheated is delivered through the pipe 79 to the compressor 80.

The energy consumption of the plant which has just been described is not in excess of approximately 500 kw.h.

for a liquefied natural gas production rate of 1000 m.³/h. (corrected for the gas under normal conditions).

Any make-up quantities required to compensate the inevitable losses from the refrigeration circuits based on propane and the mixture of ethane and methane, can be readily obtained by tapping fractions from the natural gas circuit and, optionally, introducing them into small rectification columns to obtain the required composition.

Instead of forming the end product of separation, the natural gas could of course be used as fluid refrigerant for liquefying a more volatile gas such as nitrogen, or more generally for providing a cold supply at specific temperature levels.

What we claim is:

1. A process for liquefying a volatile feed gas consisting essentially of methane, comprising passing said feed gas through a first cooling zone cocurrently with a first compressed refrigerant, cooling said feed gas and condensing said first refrigerant in said first zone by a second countercurrently flowing refrigerant which is vaporized, said first refrigerant consisting essentially of a mixture of methane and at least one hydrocarbon selected from the class consisting of ethane and ethylene and said second refrigerant being selected from the class consisting of propane and propylene, further cooling said first refrigerant in a second cooling zone, dividing the thus-cooled first refrigerant into first and second portions, expanding said first portion of further cooled refrigerant and passing it through said second cooling zone to provide said further cooling of said first refrigerant, expanding said second portion of further cooled refrigerant and passing it through a third cooling zone in heat exchange with the feed gas in which said feed gas is liquefied while the second portion of first refrigerant is vaporizer, recombining said vaporized first and second portions of said first refrigerant and passing said recombined portions of said first refrigerant in heat exchange with subsequent potions of feed gas and expanding said liquefied feed gas to a low pressure to separate a liquefied methane-rich fluid.

2. A process as claimed in claim 1, wherein said first refrigerant is a mixture of about 45% by volume of methane and about 55% by volume of ethane.

References Cited

UNITED STATES PATENTS

| 2,940,271 | 3/1959 | Jackson | 62—23 XR |
| 3,020,723 | 2/1962 | De Lury | 62—40 XR |
| 3,066,492 | 12/1962 | Gumberg et al. | 62—9 |
| 3,205,669 | 9/1965 | Grossmann | 62—23 |
| 3,218,816 | 11/1965 | Grenier | 62—28 XR |
| 3,274,787 | 9/1966 | Grenier et al. | 62—28 XR |
| 3,315,477 | 4/1967 | Carr | 62—23 |

FOREIGN PATENTS 895,094   5/1962   Great Britain.

OTHER REFERENCES

"The Liquefaction of Naturally Occurring Methane" by Barber and Haselden, Trans. Inst. Chem. Eng., vol. 35, 1957, pp. 77–86.

NORMAN YUDKOFF, *Primary Examiner.*

V. W. PRETKA, *Assistant Examiner.*

U.S. Cl. X.R.

62—23, 40, 26, 335